United States Patent
Lee et al.

(10) Patent No.: US 7,471,678 B2
(45) Date of Patent: *Dec. 30, 2008

(54) SYSTEM AND APPARATUS FOR TUNNELING SERVICE OF EXPLICIT MULTICAST

(75) Inventors: Ji-Woong Lee, Seoul (KR); Myung-Ki Shin, Daejeon (KR)

(73) Assignee: Ktfreetel Co., Ltd., Seoul (KR)

( * ) Notice: Subject to any disclaimer, the term of this patent is extended or adjusted under 35 U.S.C. 154(b) by 990 days.

This patent is subject to a terminal disclaimer.

(21) Appl. No.: 10/854,616

(22) Filed: May 25, 2004

(65) Prior Publication Data

US 2004/0218603 A1 Nov. 4, 2004

Related U.S. Application Data

(63) Continuation of application No. PCT/KR02/02186, filed on Nov. 22, 2002.

(30) Foreign Application Priority Data

Nov. 26, 2001 (KR) .................. 10-2001-0073780

(51) Int. Cl.
  *H04L 12/28* (2006.01)
  *H04L 12/56* (2006.01)
(52) U.S. Cl. ..................................... 370/390
(58) Field of Classification Search .......... 370/244, 370/313, 392, 338, 349, 352, 401, 390, 432, 370/286; 709/238, 201, 236, 248, 245, 246, 709/230
See application file for complete search history.

(56) References Cited

U.S. PATENT DOCUMENTS 6,055,236 A * 4/2000 Nessett et al. .............. 370/389

(Continued)

FOREIGN PATENT DOCUMENTS

JP 10-107852 4/1998

(Continued)

OTHER PUBLICATIONS

Boivie, R. et al., "Explicit Multicast (Xcast) Basic Specification <draft-ooms-xcast-basic-spec-02.txt>" Internet Draft, Oct. 2001.

(Continued)

*Primary Examiner*—Wing F Chan
*Assistant Examiner*—Prenell P Jones
(74) *Attorney, Agent, or Firm*—Knobbe Martens Olson & Bear LLP

(57) ABSTRACT

The present invention relates to a system and apparatus for tunneling service of explicit multicast, to efficiently transmit an explicit multicast of a packet to plural destinations. A tunnel ingress node is receives an explicit multicast packet from a sender terminal, which the explicit multicast packet has to be transmitted to plural addressee terminals. And, after the tunnel ingress node recognizes tunnel egress nodes using plural addresses terminal's address in the explicit multicast packet, it creates a tunnel header comprising transmission destinations based on the list of the recognized tunnel egress nodes. And then, the tunnel ingress node creates a tunnel packet encapsulated with the explicit multicast packet and the tunnel header, transmits the tunnel packet to the tunnel egress nodes. The tunnel egress nodes extract the tunnel header from the tunnel packet, and transmit the explicit multicasting packet to plural addressee terminals using the destination address of the tunnel header.

10 Claims, 15 Drawing Sheets

U.S. PATENT DOCUMENTS

| | | | |
|---|---|---|---|
| 6,189,039 B1 | 2/2001 | Harvey et al. | |
| 6,611,872 B1* | 8/2003 | McCanne | 709/238 |
| 6,628,654 B1* | 9/2003 | Albert et al. | 370/389 |
| 6,708,219 B1* | 3/2004 | Borella et al. | 709/245 |
| 6,721,297 B2* | 4/2004 | Korus et al. | 370/338 |
| 6,765,892 B1* | 7/2004 | Leung et al. | 370/332 |
| 6,778,531 B1* | 8/2004 | Kodialam et al. | 370/390 |
| 6,804,221 B1* | 10/2004 | Magret et al. | 370/338 |
| 7,133,928 B2* | 11/2006 | McCanne | 709/238 |
| 7,339,903 B2* | 3/2008 | O'Neill | 370/313 |
| 2002/0012327 A1* | 1/2002 | Okada | 370/328 |
| 2002/0016926 A1* | 2/2002 | Nguyen et al. | 713/201 |
| 2002/0075866 A1* | 6/2002 | Troxel et al. | 370/389 |
| 2004/0223465 A1* | 11/2004 | Lee et al. | 370/313 |
| 2006/0171322 A1* | 8/2006 | Lee | 370/244 |

FOREIGN PATENT DOCUMENTS

| | | |
|---|---|---|
| JP | 2000-236328 | 8/2000 |
| JP | 2001-230774 | 8/2001 |
| JP | 2001-244976 | 9/2001 |
| JP | 2002-217952 | 8/2002 |
| JP | 2005-507609 | 3/2005 |
| KR | 10-2001-0025940 | 4/2001 |
| KR | 10-2002-0023100 | 3/2002 |

OTHER PUBLICATIONS

Boivie, R. et al., "Explicit Multicast (Xcast) Basic Specification <draft-ooms-xcast-basic-spec-03.txt>" Internet Draft, Jun. 2002.

Lee, Jiwoong, "Explicit Multicast Tunneling <draft-lee-xcast-tunneling-oo.txt<" Internet Draft, Dec. 2001.

Lee, Jiwoong, "Explicit Multicast Tunneling <draft-lee-xcast-tunneling-01.txt<" Internet Draft, Aug. 2002.

European Search Report by European Patent Office on Apr. 13, 2007.

Vaska Visoottiviseth, Youki Kadonayashi and Suguru Yamaguchi, "An Asymmetrical Group Management System for Sender Initiated Multicast", Sep. 15, 2001 Abstract only.

Imai Yuji, Method for Making New Protocol of IPv6(specialized in Xcast), Jun. 14, 2001.

Toshiaki Saeki et al., "Destination Management on Explicit Multicast", Aug. 2000 Abstract only.

* cited by examiner

FIG. 5B

| FIRST TUNNEL EGRESS NODE ADDRESS | 0 | 0 | 0 | 1 | 0 | 0 | 0 |
|---|---|---|---|---|---|---|---|
| 510 | 511 | 512 | 513 | 514 | | | |

FIG. 5C

| 0 | SECOND TUNNEL EGRESS NODE ADDRESS | SECOND TUNNEL EGRESS NODE ADDRESS | THIRD TUNNEL EGRESS NODE ADDRESS | 0 | 1 | 1 | 1 |
|---|---|---|---|---|---|---|---|
| 520 | 521 | 522 | 523 | 524 | 525 | 526 | 527 |

FIG. 5D

| 0 | SECOND TUNNEL EGRESS NODE ADDRESS | SECOND TUNNEL EGRESS NODE ADDRESS | 0 | 0 | 1 | 1 | 0 |
|---|---|---|---|---|---|---|---|
| 530 | 531 | 532 | 533 | | 534 | 535 | |

FIG. 5E

| 0 | 0 | 0 | THIRD TUNNEL EGRESS NODE ADDRESS | 0 | 0 | 0 | 1 |
|---|---|---|---|---|---|---|---|
| 540 | 541 | 542 | 543 | | | | 544 |

FIG. 6D

| 0 | 0 | THIRD DESTINATION ADDRESS | 0 | 0 | 0 | 1 | 0 |
|---|---|---|---|---|---|---|---|
| 630 | 631 | 632 | 633 | | | 634 | |

FIG. 6E

| 0 | 0 | 0 | FOURTH DESTINATION ADDRESS | 0 | 0 | 0 | 1 |
|---|---|---|---|---|---|---|---|
| 640 | 641 | 642 | 643 | | | | 644 |

SYSTEM AND APPARATUS FOR TUNNELING SERVICE OF EXPLICIT MULTICAST

RELATED APPLICATIONS

This application is a continuation application, and claims the benefit under 35 U.S.C. §§ 120 and 365 of PCT Application No. PCT/KR02/02186, filed on Nov. 22, 2002 and published Jun. 5, 2003, in English, which is hereby incorporated by reference. This application also relates to U.S. patent application entitled "METHOD AND APPARATUS FOR TUNNELING SERVICE OF EXPLICIT MULTICAST IN MOBILE IP NETWORK," filed on Jun. 14, 2004 and having application Ser. No. 10/868,641.

BACKGROUND OF INVENTION

1. Field of the Invention

The present invention relates to a system and apparatus for explicit multicast tunneling that effectively perform transmission of an explicit multicast packet to be sent to a plurality of destinations.

2. Description of the Related Technology

Generally, in the relevant art a tunnel is a virtual forwarding (one-way) path between two nodes in a network, and is used to send a data packet from one network to another network when these networks are segregated from each other due to the different protocols that these networks use. Also, the tunnel can be used to send the data packet within the network or between networks that use the same protocol.

SUMMARY OF CERTAIN INVENTIVE ASPECTS OF THE INVENTION

One aspect of the invention provides a system and apparatus for explicit multicast (hereinafter "xcast") tunneling, which can perform the multicast tunneling according to the tunnel packet having destination addresses of the tunnel egress nodes. Another aspect of the invention is to provide system and apparatus for xcast tunneling, which can send an xcast packet to a plurality of destinations being coupled to the same tunnel egress node according to the tunnel packet that includes the tunnel header having the address of the tunnel egress node as the destination address.

Another aspect of the invention provides an explicit multicast tunneling method over a network in which a source and a plurality of destinations are connected to each other by a tunnel ingress node and a plurality of tunnel egress nodes, said method comprising the steps of: receiving an explicit multicast packet to be sent to the plurality of destinations, wherein the explicit multicast packet carries addresses of the plurality of destinations within it; determining the tunnel egress nodes based on the addresses of the plurality of destinations within the received explicit multicast packet in order to produce an address list of tunnel egress nodes; producing a tunnel header having the address list of tunnel egress nodes as a destination address; producing a tunnel packet by encapsulating the explicit multicast packet with the produced tunnel header; sending the tunnel packet to the tunnel egress nodes; separating the tunnel header from the tunnel packet received by the tunnel egress node to obtain the explicit multicast packet; modifying the destination address of the separated explicit multicast packet by the destination address of the separated tunnel header; and multicast routing the explicit multicast packet to the plurality of destinations by the modified destination addresses. Another aspect of the invention provides an apparatus for explicit multicast tunneling over a network.

In one embodiment, the tunnel header comprises a tunnel ingress node address field, a link local multicast address field, an address list of tunnel egress nodes field, and a bitmap.

In one embodiment, the sending the tunnel packet to the tunnel egress nodes comprises determining a next hop of the tunnel packet and modifying the destination address of the tunnel header according to the determined next hop.

Another aspect of the invention provides an explicit multicast tunneling method over a network in which a source and a plurality of destinations are connected to each other by a tunnel ingress node and a tunnel egress node, wherein the plurality of destinations occupy the tunnel egress node jointly, said method comprising the steps of: receiving an explicit multicast packet to be sent to the plurality of destinations; determining the tunnel egress node by the use of addresses of the plurality of destinations within the received explicit multicast packet; producing a tunnel header having an address of the tunnel egress node as destination address; producing a tunnel packet by encapsulating the explicit multicast packet with the produced tunnel header; sending the produced tunnel packet to the tunnel egress node according to the destination address of the tunnel header; separating the tunnel header from the tunnel packet received by the tunnel egress node; and multicast routing the separated explicit multicast packet to the plurality of destinations.

In one embodiment, the tunnel header comprises a tunnel ingress node address field and a tunnel egress node address field.

Another aspect of the invention provides a data signal comprising a tunnel packet that is transmitted through a wired/wireless network in which a source and a plurality of destinations are connected to each other by a tunnel ingress node and a plurality of tunnel egress nodes, said tunnel packet comprising: a tunnel header comprising a source address field for indicating the tunnel ingress node address, a link local address field, and a destination address field for indicating an address list of the plurality of tunnel egress nodes; and a payload for an original explicit multicast packet received from the source, wherein the explicit multicast packet comprises a source address field for indicating the source address, a link local multicast address field, a destination address field for indicating an address list of the plurality of destinations, and a data field.

Another aspect of the invention provides a data signal comprising a tunnel packet that is transmitted through a wired/wireless network in which a source and a plurality of destinations are connected to each other by a tunnel ingress node and a tunnel egress node, wherein the plurality of destinations occupy the tunnel egress node jointly, said tunnel packet comprising: a tunnel header comprising a source address field for indicating the tunnel ingress node address, and a destination address field for indicating the tunnel egress node address; and a payload for an original explicit multicast packet received from the source, wherein the explicit multicast packet comprises a source address field for indicating the source address, a link local multicast address field, a destination address field for indicating an address list of the plurality of destinations, and a data field.

BRIEF DESCRIPTION OF THE DRAWINGS

FIGS. 5A to 5E show a destination address field structure of the tunnel header.

FIGS. 6A to 6E show the data structures of the original packet in xcast tunneling operation according to one embodiment of the invention.

DETAILED DESCRIPTION OF CERTAIN EMBODIMENTS OF THE INVENTION

Figure 1:
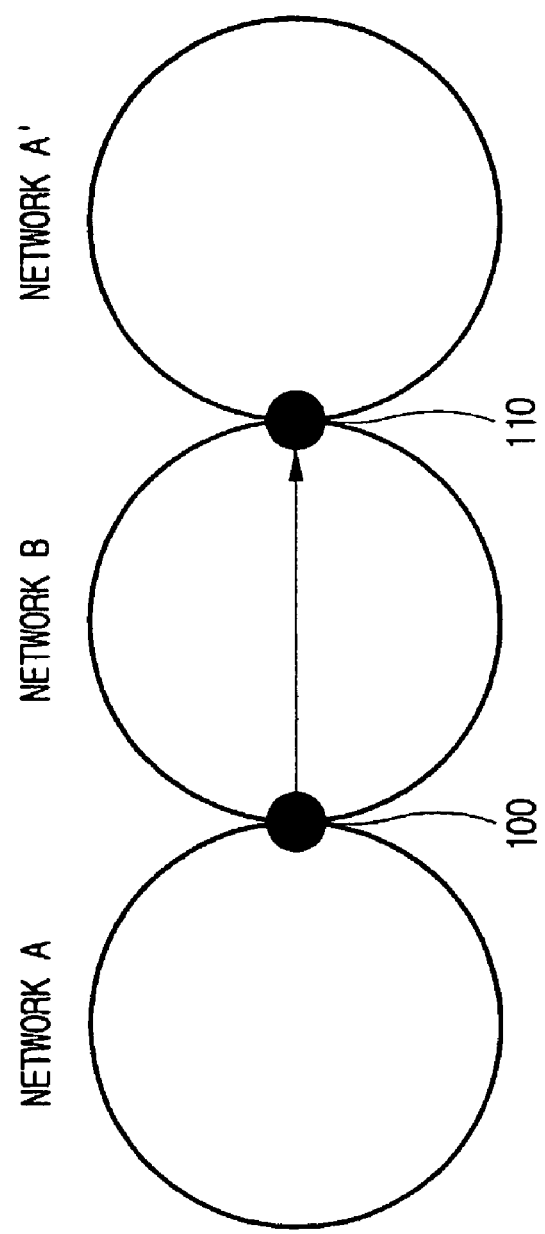
FIG. 1 is a conceptual drawing illustrating the use of the tunnel.

FIG. 1 is a conceptual drawing illustrating the use of the tunnel when network A and network A', both using the same protocol are segregated by network B using a different protocol whereby two nodes adjoin the network B, i.e., router A and router B operate as the entrance and exit of the tunnel respectively. In this situation, router A and router B must comprehend all protocols used by network A, network A', and network B. As shown in FIG. 1, the tunnel may comprise a tunnel ingress node 100 where the tunnel begins (router A), a tunnel egress node 110 where the tunnel ends (router B), and a tunnel packet in between them. A plurality of transit nodes on the tunnel path may exist.

Figure 2:
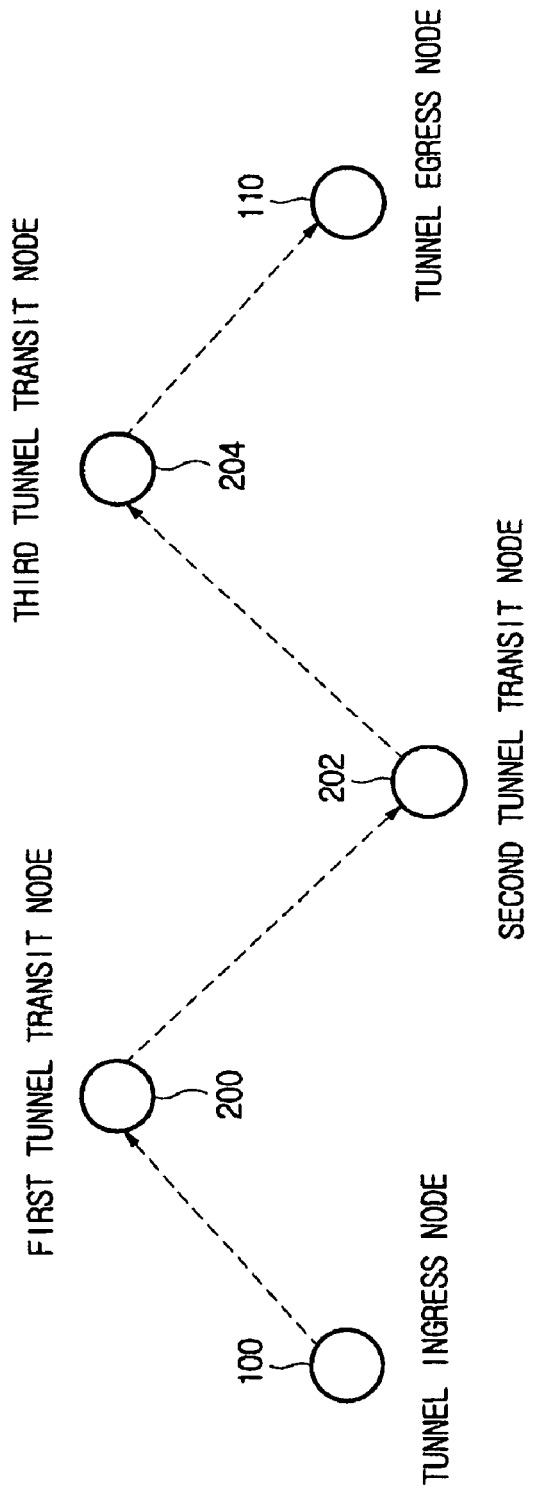
FIG. 2 is a conceptual drawing showing the transit nodes on the tunnel path.

FIG. 2 is a conceptual drawing showing the transit nodes on the tunnel path between the tunnel ingress node 100 and the tunnel egress node 110 as follows. The first tunnel transit node 200, the second tunnel transit node 202, and the third tunnel transit node 204 on the tunnel path. However, since the path of the packet over Internet varies according to the routing of each node, the tunnel path between the tunnel ingress node and the tunnel egress node also varies.

Generally, if tunneling occurs according to predetermined conditions when a packet reaches the tunnel ingress node, the packet is called an 'original packet' from the view of the tunnel. In this situation, the header of the original packet is called an 'original header'.

The tunnel ingress node produces a new packet for tunneling of the original packet. In detail, the tunnel ingress node produces a tunnel header of which the source is the tunnel ingress node and the destination is the tunnel egress node, and then produces the tunnel packet by encapsulating the original packet with the produced tunnel header. Accordingly, the original packet is the payload. Also, the transit nodes on the tunnel path perform routing based on the tunnel header of the tunnel packet rather than the original header of the original packet.

As described above, since the above tunneling is a kind of unicast tunneling that has one ingress node and one egress node for the tunnel, there is one destination address of the original packet, and as a result, one tunnel egress node. Thus, according to the above tunneling method, the xcast packet to be sent to a plurality of destinations must be converted into unicast packets for transmission to the plurality of destinations.

Subsequently, since replication of the converted unicast packet and transmission to each destination are required, there is a problem that the link use efficiency within the given bandwidth increases. Also, since information of the original packet, that is, the payload of the tunnel packet does not change during the explicit multicast tunneling according to the above tunneling method, the plurality of tunnel egress nodes determine that address information of all destinations of the original packet is valid, which means the tunnel packet does not diverge from the branch node(s). Accordingly, each tunnel egress node performs routing to all destination addresses listed on the original packet, so that each destination may receive the same packets in duplicate.

Figure 3:
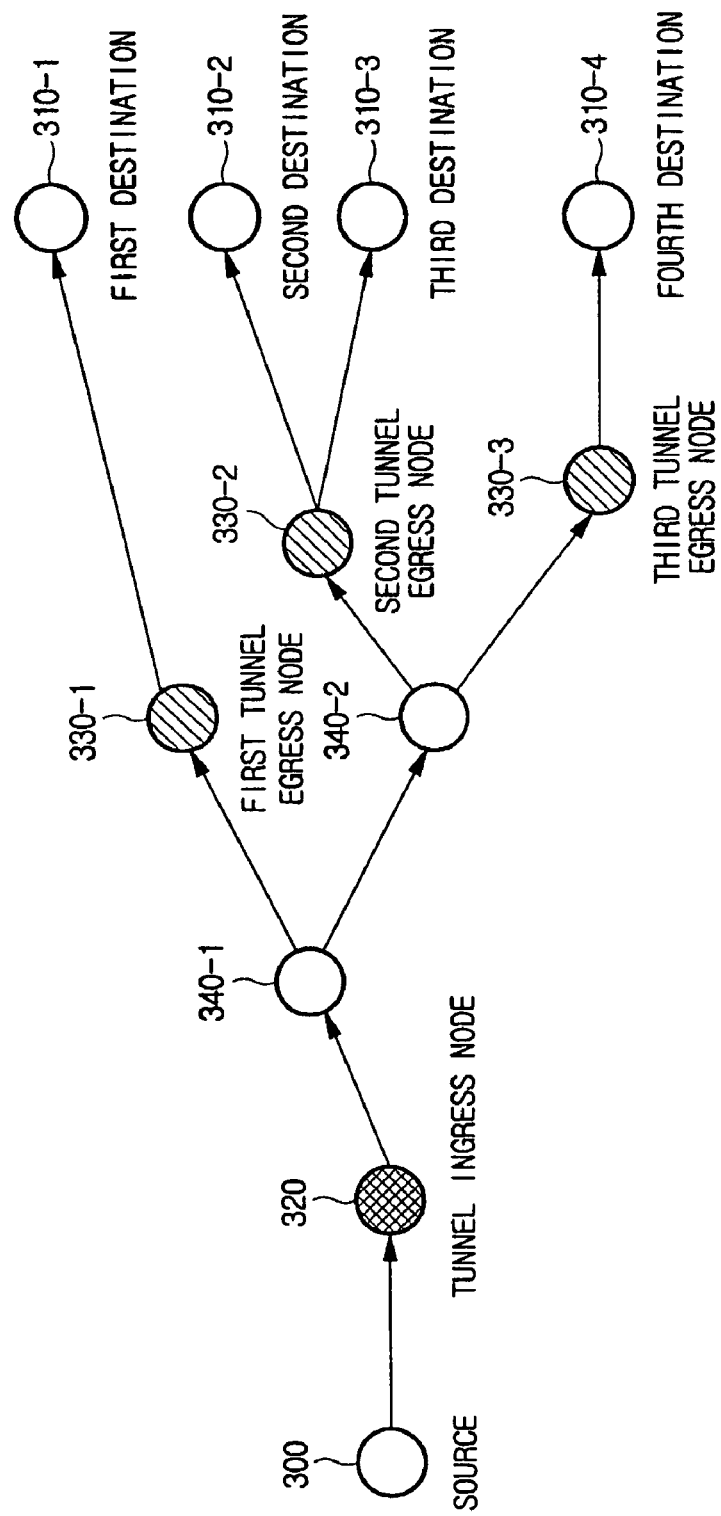
FIG. 3 is a block diagram of an apparatus for xcast tunneling according to one embodiment of the invention.
Figure 4A:
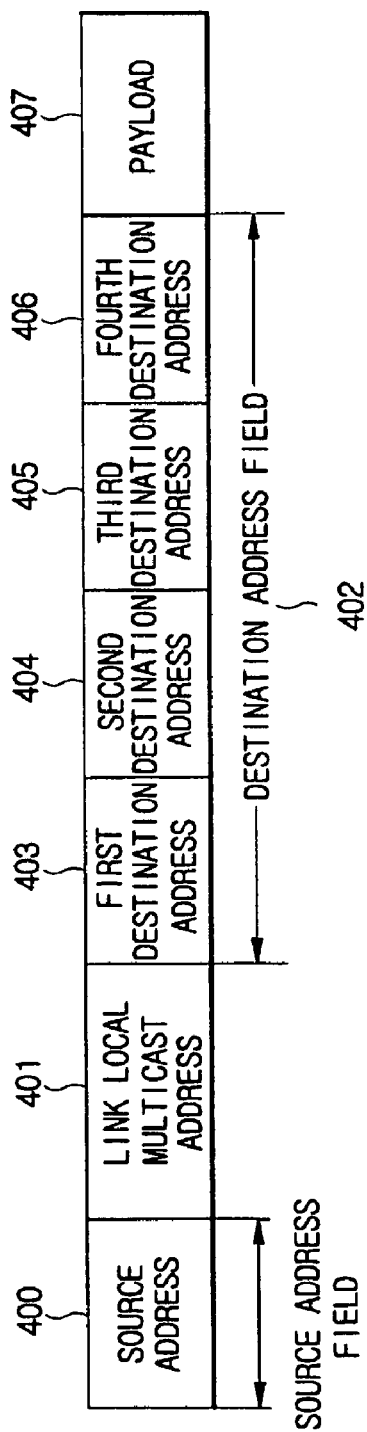
FIG. 4A is a data structure of an original packet for multicast tunneling according to one embodiment of the invention.
Figure 4B:
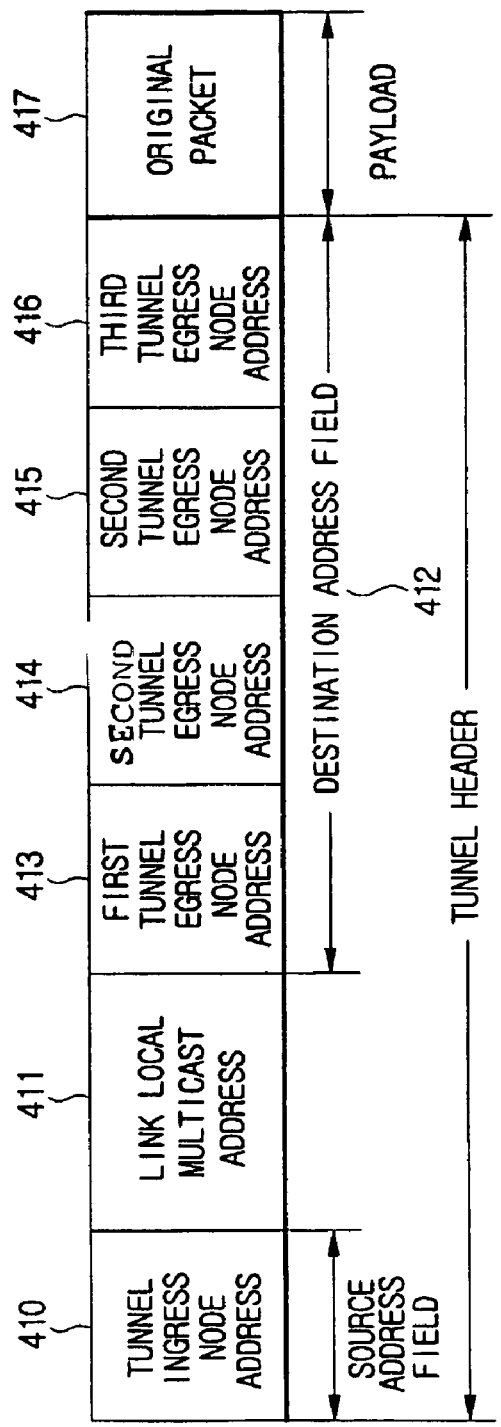
FIG. 4B is a data structure of a tunnel packet for multicast tunneling.

Hereinafter, one embodiment of the invention will be described with the accompanying drawings. FIG. 3 is a block diagram of an apparatus for xcast tunneling according to one embodiment of the invention, FIG. 4A is a data structure of an original packet for multicast tunneling according to one embodiment of the invention, and FIG. 4B is a data structure of tunnel packet for multicast tunneling. FIGS. 5A to 5E show a destination address field structure of the tunnel header.

Referring to FIG. 3, the apparatus for xcast tunneling comprises a source 300 (i.e., defined as 'source terminal' but hereinafter indicated as 'source'); the first to fourth destinations 310-1, 310-2, 310-3, 310-4; a tunnel ingress node 320; the first to third tunnel egress nodes 330-1, 330-2, 330-3; and the first and the second tunnel transit nodes 340-1, 340-2.

The source 300 and the first to fourth destinations 310-1, 310-2, 310-3, 310-4 (i.e., 'destination' defined as a destination terminal but hereinafter indicated as 'destination'.) are included within the networks that use the same network protocol, and the tunnel ingress node 320 and the first to third tunnel egress nodes 330-1, 330-2, 330-3 are included within other networks that use a different network protocol from the network of the source 300 and the first to fourth destinations 310-1, 310-2, 310-3, 310-4. Otherwise, the network of the tunnel ingress node 320 and the first to third tunnel egress nodes 330-1, 330-2, 330-3 may use the same network protocol of the source 300 and the first to fourth destinations 310-1, 310-2, 310-3, 310-4. In addition, the tunnel ingress node 320 and the first to third tunnel egress nodes 330-1, 330-2, 330-3 are tunnel end nodes, where the tunnel begins or ends, for sending xcast data packet of the source 300 to the first to fourth destinations 310-1, 310-2, 310-3, 310-4.

The first destination 310-1 is coupled to the first tunnel egress node 330-1, the second and the third destinations 310-2, 310-3 are coupled to the second tunnel egress node 330-2, and the fourth destination 310-4 is coupled to the third tunnel egress node 330-3, respectively. Also the first and the second tunnel transit nodes 340-1, 340-2 are located on the path from the tunnel ingress node 320 to the first to third tunnel egress nodes 330-1, 330-2, 330-3.

The operation of the xcast multicast tunneling performed on the aforementioned network configuration will be described. Firstly, the source 300 produces an xcast data packet as shown in FIG. 4A to be sent to the first to fourth destinations 310-1, 310-2, 310-3, 310-4 and sends the produced xcast data packet to the tunnel ingress node 320. Note that the xcast data packet in FIG. 4A, which is produced by the source 300, is called an 'original packet'. Referring to FIG. 4A, the original packet comprises a source address field 400, a link local multicast address field 401, a destination address field 402, and a payload 407. The address of the source from where the original packet is sent and the address of the link local multicast for discriminating xcast from multicast are listed on the address field 400 and the link local multicast address field 401 respectively. The link local multicast address that is one of the multicast address groups to differentiate multicast '244.0.0.0' to '239.255.255.255' is assigned by a particular address assigning authority. The destination address field 402 comprises the first destination address field 403, the second destination address field 404, the third destination address field 405, and the fourth destination address field 406, while the first to fourth destination addresses are listed on the first to fourth destination address fields 403, 404, 405, 406, respectively.

On receiving the original packet from the source 320, the tunnel ingress node 320 produces a tunnel packet as shown in FIG. 4B to perform a tunneling in order to send the packet to the first to fourth destinations 310-1, 310-2, 310-3, 310-4. That is, the tunnel ingress node 320 locates the tunnel egress nodes by the use of addresses of the first to fourth destinations 310-1, 310-2, 310-3, 310-4 listed on the destination address field 402 of the received original packet. In this situation, the egress nodes of the tunnel are the first to third tunnel egress nodes 330-1, 330-2, 330-3, so that the tunnel ingress node 320 produces the tunnel header having the address of the tunnel ingress node as the address of the source, and the addresses of the link local multicast and the first to third tunnel egress nodes as the addresses of destinations. At this time, there are several options to determine the tunnel egress node, (i.e., a manual configuration or a mobile binding list), however, these options are not related directly to the invention, so their detailed description will be omitted. Subsequently, the tunnel ingress node 320 produces the first tunnel packet by encapsulating the original packet with the produced tunnel header.

As shown in FIG. 4B, the first tunnel packet produced by the tunnel ingress node 320 comprises the tunnel header, which includes a source address field 410, a link local address field 411, a destination address field 412, and a payload 417. The address of the tunnel ingress node is listed on the source address field 410, the addresses of the first to third tunnel egress nodes for sending a data packet to the first to fourth destination 310-1, 310-2, 310-3, 310-4 are listed on the destination address field 402 in relation to the listing order of destination addresses in the original packet, and the original packet is on the payload 417. That is, the destination address field 412 comprises the first tunnel egress node address field 413 for sending the data packet to the first destination 310-1, the second tunnel egress node address fields 414, 415 for sending the data packet to the second and third destinations 310-2, 310-3 and the third tunnel egress node address field 416 for sending the data packet to the fourth destination 310-4. Since the second tunnel egress node 330-2 sends the data packet to the second and third destinations 310-2, 310-3, the address of the second tunnel egress node is listed in duplicate in the destination address field 412. The first to third tunnel egress node address fields 413, 414, 415, 416 are configured to be 32 bits according to IPv4 and 128 bits according to IPv6.

Figure 5A:
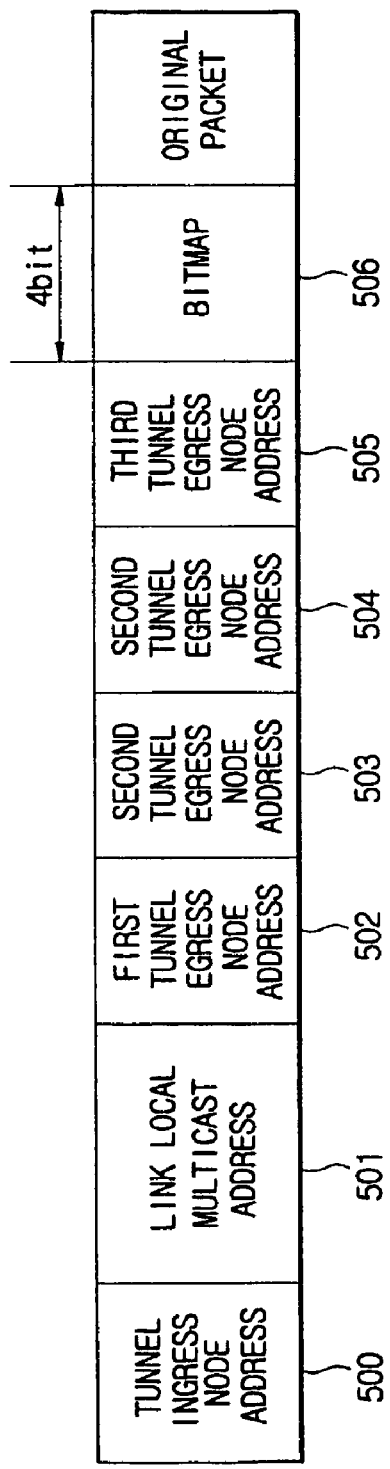

Also, the destination address field 412 comprises a bitmap 506 to determine faster the next hop of the xcast data packet. That is, as shown in FIG. 5A, the tunnel packet comprises the tunnel ingress node address field 500, the link local multicast address field 501, the first tunnel egress node address field 502, the second tunnel egress node address fields 503, 504, the third tunnel egress node address field 505, the bitmap 506 and the original packet. Since the second and third destinations are coupled to the second tunnel egress node in common, the address of the second tunnel egress node is listed in duplicate in the xcast data packet. The number of bits of the bitmap corresponds to the number of destinations, and since there are four destinations, the bitmap 506 has four bits in this situation. That is, the bitmap 506 comprises one bit indicating the state of transmission to the first tunnel egress node, two bits indicating the state of transmission to the second tunnel egress node, and one bit indicating the state of transmission to the third tunnel egress node.

The tunnel ingress node 320 sends the first tunnel packet as shown in FIG. 5A to the first tunnel transit node 340-1 as a next hop, and the first tunnel transit node 340-1 finds the next hop based on destination information listed on the destination address field of the first tunnel packet. Also, by the link local multicast address in the link local multicast address field, the tunnel transit node 340-1 finds that the first tunnel packet corresponds to xcast transmission. That is, the first transit node 340-1 finds the first egress node 330-1 and the second tunnel transit node 340-2, both as next hops, from the first tunnel packet in FIG. 5A, and according to the next hops, produces the second and third tunnel packets having the destination field as shown in FIGS. 5B and 5C. Since the second tunnel packet is sent to the first egress node by the xcast routing, '0' is listed on the useless address field. That is, in the destination address field of the tunnel packet as shown in FIG. 5B, the address of the first tunnel egress node is listed on the first tunnel egress node address field 510, and '0' is listed on the second tunnel egress node address field 511, 512 and the third tunnel egress node address field 513. Also, in the bitmap of the second tunnel packet, '1' is listed on the bit 514 indicating the state of transmission to the first tunnel egress node, and '0' is listed on other bits. Accordingly, '1' and '0' are listed on the bitmap of the second tunnel packet with the same form as the state of the destination field of the tunnel header. Since the configuration of the second tunnel packet in FIG. 5B is the same as the configuration in FIG. 5A except for the destination address field, the same description will be omitted.

In the destination field of the third tunnel packet to be sent to the second tunnel transit node 340-2 as shown in FIG. 5C, '0' is listed on the first tunnel egress node address field 520, the address of the second tunnel egress node 330-2 is listed on the second tunnel egress node address field 521, 522, and the address of the third tunnel egress node is listed on the third tunnel egress node address field 523. Since the second destination 310-2 and the third destination 310-3 occupy the second tunnel egress node 330-2 jointly, the address of the second tunnel egress node is listed in duplicate. Also, in the bitmap of the third tunnel packet, '0' is listed on the bit 524 indicating the state of transmission to the first tunnel egress node, while '1' is listed on the bits 525, 526, 527 indicating the state of transmission to the second and third tunnel egress nodes. Since the configuration of the third tunnel packet in FIG. 5C is the same as the configuration in FIG. 5A except for the destination address field, the same description will be omitted.

The tunnel transit node 340-1 sends the second and third tunnel packets to the first tunnel egress node 330-1 and the second tunnel transit node 340-2, respectively. The second tunnel transit node 340-2 finds the next hop based on information listed on the destination address field of the third tunnel packet. The next hops are the second tunnel egress node 330-2 and the third tunnel egress node 330-3, so the second tunnel transit node 340-2 replicates the third tunnel packet to produce the fourth and fifth tunnel packets. In the fourth tunnel packet to be sent to the second tunnel egress node 330-2 as shown in FIG. 5D, '0' is listed on the first tunnel egress node address field 530 and the third tunnel egress node address field 533 of the destination address field respectively, and the address of the second tunnel egress node 330-2 is listed on the second tunnel egress node address field 531, 532, respectively. Also, in the bitmap of the fourth tunnel field, '1' is listed on the bits 534, 535 indicating the state of transmission to the second tunnel egress node, and '0' is listed on the other bits.

Further, in the fifth tunnel packet to be sent to the third tunnel egress node 330-3 as shown in FIG. 5E, '0' is listed on the first and second tunnel egress node address fields 540, 541, 542 of the destination address fields respectively, and the address of the third tunnel egress node 330-3 is listed on the third tunnel egress node address field 543. Also, in the bitmap of the fifth tunnel field, '1' is listed on the bit 544 indicating the state of transmission to the third tunnel egress node, and '0' is listed on the other bits.

The first to third tunnel egress nodes 330-1, 330-2, 330-3, which receive the first to fifth tunnel packets, separate the tunnel headers from the first to fifth tunnel packets and then perform the bitmap inheritance(AND-like operation), that is, change part of the address information of the original header, which corresponds to '0' of the destination address field of the tunnel header, into '0'.

Figure 6A:
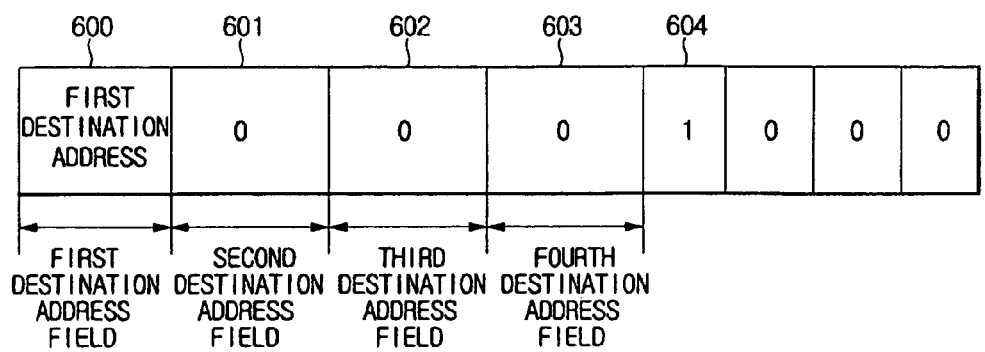

The aforementioned operation will be described in more detail with the accompanying drawings. FIGS. 6A to 6E show the data structures of the original packet in the xcast tunneling operation according to one embodiment of the invention. The first tunnel egress node 330-1 separates the tunnel header from the second tunnel packet received from the first tunnel transit node 340-1, and finds the first destination 310-1 as the next hop based on destination information of the destination address field of the original packet. Then, the first tunnel egress node 330-1 changes the destination address or addresses of the original packet corresponding to '0' of the destination address field of the separated tunnel header into '0' to produce the first xcast packet and sends the produced first xcast packet to the first destination 310-1. That is, since the second and third egress node fields of the destination address field of the tunnel header are '0', the first tunnel egress node 330-1 sends the first xcast packet that is the original packet with '0' on the address fields of the second to fourth destinations 310-2, 310-3, 310-4. As shown in FIG. 6A, in the first xcast packet, the address of the first destination is listed on the first destination address field 600 of the destination address field, and '0' is listed on the second to fourth destination address fields 601, 602, 603. However, '1' is listed on the bit 604 of the bitmap of the first xcast packet, which indicates the transmission of packet to the first destination 310-1, while '0' is listed on other bits.

Figure 6B:
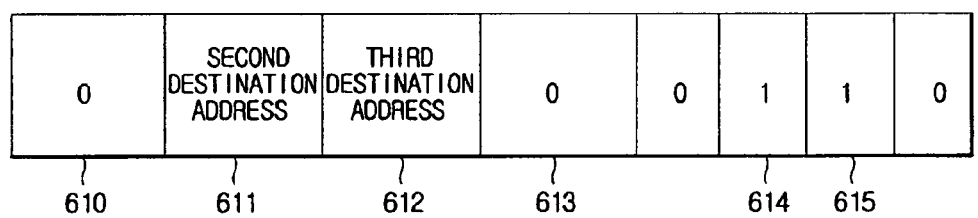

The second tunnel egress node 330-2 separates the tunnel header from the second tunnel packet received from the second tunnel transit node 340-2, and finds the second and third destinations 310-2, 310-3 as the next hop based on destination information of the destination address field of the original packet. Then, the second tunnel egress node 330-2 changes the destination address or addresses of the original packet corresponding to '0' of the destination address field of the separated tunnel header into '0' to produce the second xcast packet. As shown in FIG. 6B, in the second xcast packet, '0' is listed on the first destination address field 610, and the second and third destination addresses are listed on the second and third destination address fields 611, 612 respectively. Also, '1' is listed on the bits 614, 615 of the bitmap of the second xcast packet, which indicates the transmissions of packet to the second and third destination, and '0' is listed on the other bits. According to the xcast routing, the second tunnel egress node 330-2 replicates the second xcast packet to produce the third to fourth xcast packets, and sends the produced third to fourth xcast packets to the second to third destinations 310-2, 310-3 respectively.

Figure 6C:
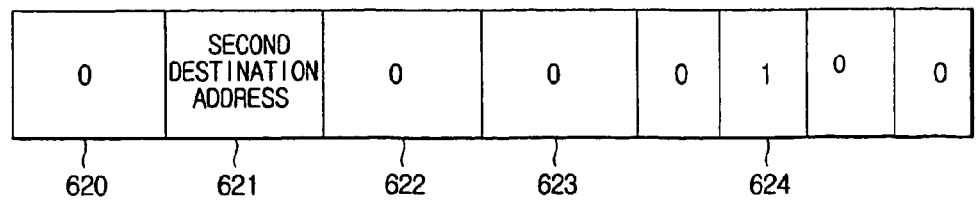

As shown in FIG. 6C, in the third xcast packet to be sent to the second destination 310-2, '0' is listed on the first, the third and the fourth destination address fields 620, 622, 623, and the address of the second destination is listed on the second destination address field 621 of the destination address field. Also, '1' is listed on the bit 624 of the bitmap of the third xcast packet, which indicates the transmission of packet to the second destination 310-2, and '0' is listed on the other bits.

As shown in the FIG. 6D, in the fourth xcast packet to be sent to the third destination 310-3, '0' is listed on the first, the second and the fourth destination address fields 630, 631, 633, and the address of the third destination is listed on the third destination address field 632 of the destination address field. Also, '1' is listed on the bit 634 of the bitmap of the fourth xcast packet, which indicates the transmission of packet to the third destination 310-3, and '0' is listed on the other bits.

The third tunnel egress node 330-3 separates the tunnel header from the fifth tunnel packet received from the second tunnel transit node 340-2, and finds the fourth destination 310-4 as next hop based on the destination information of the destination address field of the original packet. Then, the third tunnel egress node 330-3 changes the destination addresses of the original packet corresponding to '0' of the destination address field of the separated tunnel header into '0' to produce the fifth xcast packet, and sends the fifth xcast packet to the fourth destination 310-4. That is, since the first and second egress node fields of the destination address field of the tunnel header are '0', the third tunnel egress node 330-3 sends the fifth xcast packet that is the original packet with '0' on the address fields of the first to third destinations and '1' on the address field of the fourth destination. As shown in FIG. 6E, in the fifth xcast packet, '0' is listed on the first to third destination address fields 640, 641, 642, and the address of the fourth destination is listed on the fourth destination address field 643 of the destination address field. Also, '1' is listed on the bit 644 of the bitmap of the fifth xcast packet, which indicates the transmission of the packet to the fourth destination 310-4, and '0' is listed on the other bits.

Figure 7:
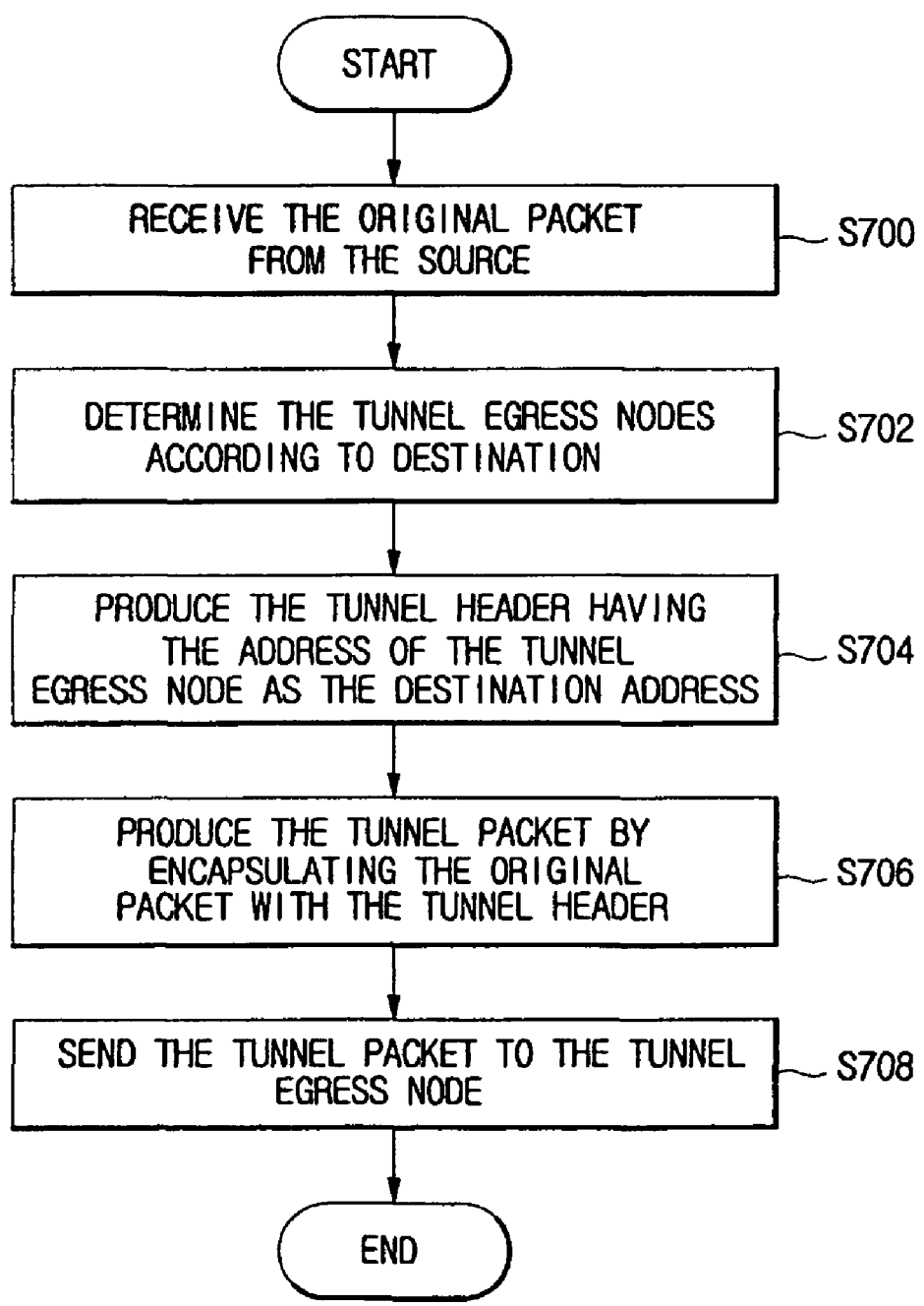
FIG. 7 is a flowchart for xcast tunneling in the tunnel ingress node according to one embodiment of the invention.

The method for xcast tunneling according to one embodiment of the invention will be described with accompanying drawings as follows. FIG. 7 is a flowchart for xcast tunneling in the tunnel ingress node according to one embodiment of the invention. The tunnel ingress node 320 receives the original packet to be sent to the first to fourth destinations 310-1, 310-2, 310-3, 310-4 from the source. (S700) The original packet has explicit listed addresses, as destination information, of the first to fourth destination addresses in the destination address field. The tunnel ingress node 320 determines the tunnel egress node(s) based on destination information listed on the destination address field of the received original packet. (S702) The determined tunnel egress nodes are the first to third tunnel egress nodes 330-1, 330-2, 330-3 that are coupled to the first to fourth destinations 310-1, 310-2, 310-3, 310-4 respectively. The tunnel ingress node 320 produces the tunnel header having the addresses of the first to third tunnel egress nodes 330-1, 330-2, 330-3 as destination addresses, with the address of the tunnel ingress node 320 as the source address. (S704)

The tunnel ingress node 320 produces the tunnel packet by encapsulating the original packet with the produced tunnel header (S706) and sends the produced tunnel packet to the first to third tunnel egress nodes 330-1, 330-2, 330-3 according to the destination addresses of the tunnel header. (S708)

The tunnel packet may extend to the first to third tunnel egress nodes 330-1, 330-2, 330-3 through a plurality of tunnel transit nodes.

According to the xcast routing, the first to third tunnel egress node address fields of the destination address fields of the tunnel header may be changed to '0' within the tunnel when the first to third tunnel egress node address fields are not used anymore. Also, the unnecessary bit(s) of the bitmap of the tunnel packet is changed into '0', and the necessary bit(s) of the bitmap of the tunnel packet is changed into '1' for the purpose of fast routing for the xcast packet.

Figure 8:
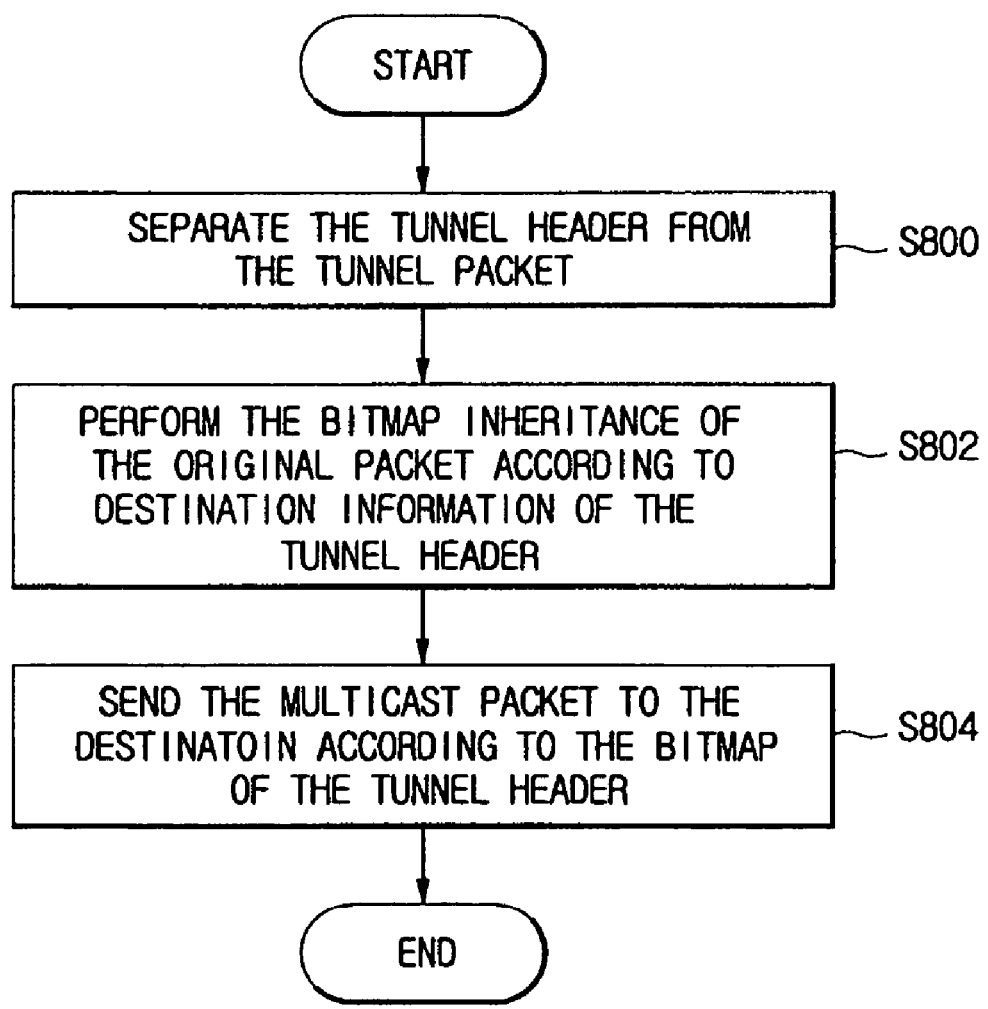
FIG. 8 is a flowchart for xcast tunneling in the tunnel egress node according to the preferred embodiment of the invention.

FIG. 8 is a flowchart for xcast tunneling in the tunnel egress node according to one embodiment of the invention. The first to third tunnel egress nodes 330-1, 330-2, 330-3 receive the tunnel packet from the tunnel ingress node 320 and separate the tunnel header from the received tunnel packet. (S800) The first to third tunnel egress nodes 330-1, 330-2, 330-3 perform the bitmap inheritance according to destination information listed on the destination address field of the tunnel header. (S802) That is, the first to third tunnel egress nodes 330-1, 330-2, 330-3 change part of the address information of the original header, which corresponds to '0' of the destination address field of the tunnel header, into '0'. Simultaneously, the bitmap of the original packet is changed to have the same form of the destination address field. The first to third tunnel egress nodes 330-1, 330-2, 330-3 send the original packet of which the destination address field has been changed, or more particularly the xcast packet to the first to fourth destination 310-1, 310-2, 310-3, 310-4 respectively according to the xcast routing algorithm. (S804)

Figure 9:
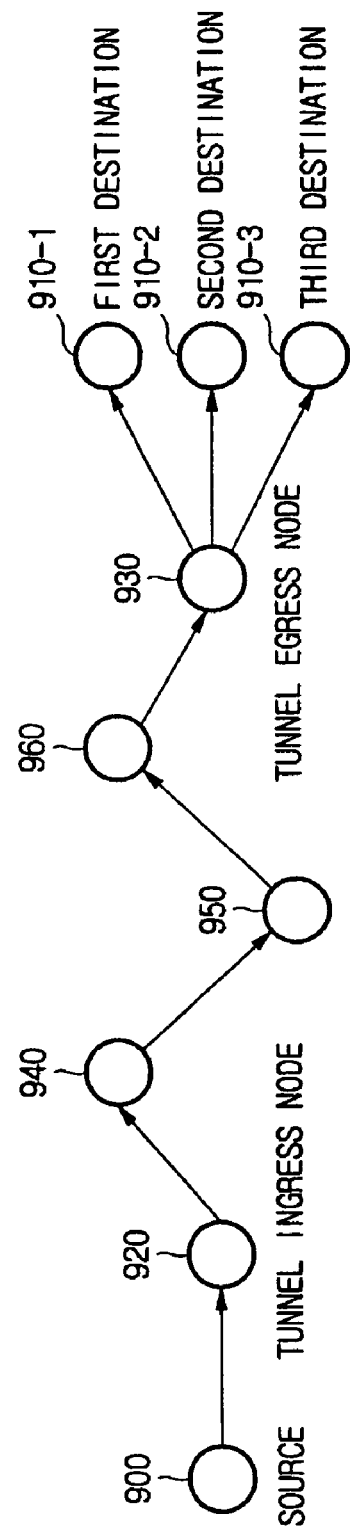
FIG. 9 illustrates the system for unicast tunneling of xcast according to another embodiment of the invention.
Figure 10A:
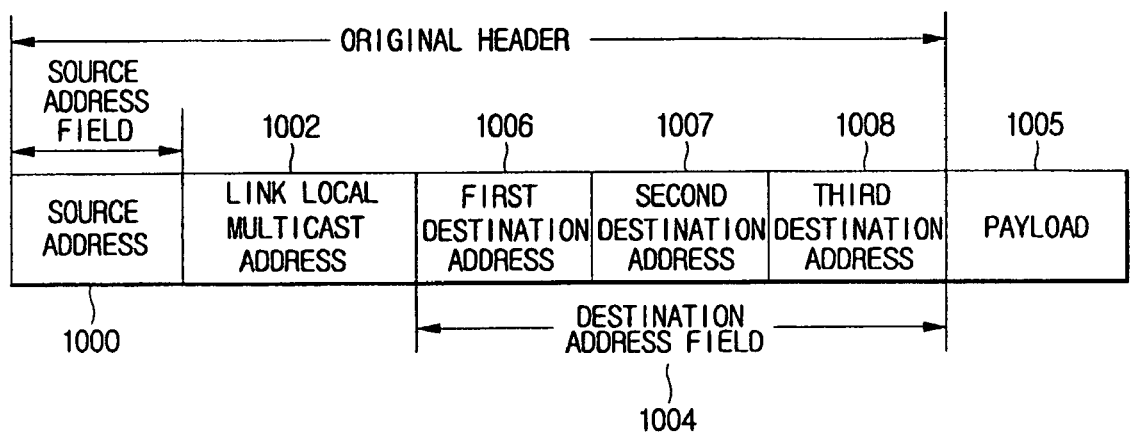
FIG. 10A is a data structure of the original packet in the system for unicast tunneling of xcast according to another embodiment of the invention.
Figure 10B:
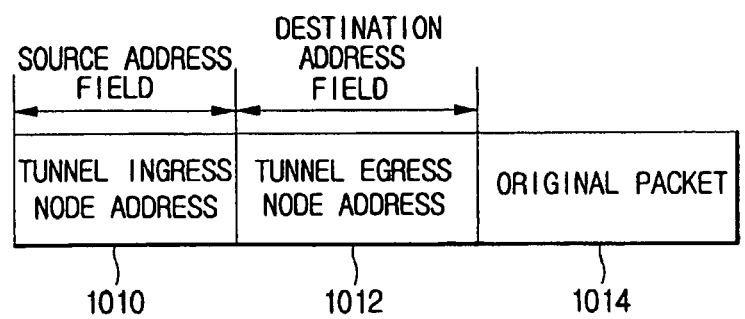
FIG. 10B is a data structure of tunnel packet in the system for unicast tunneling of xcast according to another preferred embodiment of the invention.

Another embodiment of the invention will be described with the accompanying drawings in the following. FIG. 9 illustrates the system for unicast tunneling of xcast according to another embodiment of the invention, FIG. 10A is a data structure of the original packet in the system for unicast tunneling of xcast according to another embodiment of the invention, and FIG. 10B is a data structure of tunnel packet in the system for unicast tunneling of xcast according to another embodiment of the invention.

Referring to FIG. 9, the system for unicast tunneling of xcast comprises the source 900, the first to third destinations 910-1, 910-2, 910-3, the tunnel ingress node 920, the tunnel egress node 930, and the first to third tunnel transit nodes 940, 950, 960. The source 900 and the first to third destinations 910-1, 910-2, 910-3 are included within the networks that use the same network protocol, while the tunnel ingress node 920 and the tunnel egress node 930 are included within other networks that use a different network protocol from the network of the source 900 and the first to third destinations 910-1, 910-2, 910-3. Otherwise, the network of the tunnel ingress node 920 and the tunnel egress nodes 930 may use the same network protocol of the source 900 and the first to third destinations 910-1, 910-2, 910-3. In addition, the tunnel ingress node 920 and the tunnel egress node 930 are tunnel end nodes, indicating where the tunnel begins or ends, for sending xcast data packet of the source 900 to the first to third destinations 910-1, 910-2, 910-3. The tunnel egress node 930 is a gateway router of the sub-net where the first to third destinations 910-1, 910-2, 910-3 are coupled.

The unicast tunneling of xcast regarding the aforementioned network will be described with accompanying drawings. The source 900 sends the xcast packet of FIG. 10A to be sent to the first to third destinations 910-1, 910-2, 910-3 to the tunnel ingress node 920. The xcast packet sent by the source 900 is called an 'original packet'. As shown in FIG. 10A, the original packet comprises the original header having the source address field 1000, the link local multicast address field 1002 and the destination address field 1004, and the payload 1005. The destination address field 1004 comprises the first to third destination address fields 1006, 1007, 1008 where the addresses of the first to third destinations that will receive the xcast packet are listed respectively. The link local multicast address is listed on the link local multicast address field 1002, and the link local multicast address as one of the multicast address groups for differentiating multicast '244.0.0.0' to '239.255.255.255' is assigned by a particular address assigning authority.

According to destination address information listed on the destination address field 1004 of the original packet that is received from the source 900, the tunnel ingress node 920 determines the tunnel egress node that the packet passes through when being sent to the first to third destinations 910-1, 910-2, 910-3. Since the tunnel egress node 930 that the original packet passes through when being sent to the first to third destinations 910-1, 910-2, 910-3 is the only one, the tunnel ingress node 920 produces the tunnel header with the address of the tunnel ingress node as the address of the source and the address of the tunnel egress node as the address of the destination.

The tunnel ingress node 920 produces the tunnel packet by encapsulating the original packet with the produced tunnel header, and sends the tunnel packet to the tunnel egress node 930 through the first to third tunnel transit nodes 940, 950, 960. As shown in FIG. 10B, the tunnel packet comprises the tunnel header having the source address field 1010 and the destination address field 1012, and the payload 1014. The address of the tunnel ingress node and the address of the tunnel egress node are listed on the source address field 1010 and the destination address field 1012 in the tunnel header respectively, and the payload is the original packet in FIG. 10A.

The first to third tunnel transit nodes 940, 950, 960 perform the unicast tunneling by sending the tunnel packet to the tunnel egress node 930 according to the destination address, that is, the address of the tunnel egress node listed on the destination address field 1012 of the tunnel packet in FIG. 10B.

The tunnel egress node 930 separates the tunnel header from the tunnel packet received from the third tunnel transit node 960 and performs the xcast routing to send the original packet, that is, the payload of the tunnel packet to the first to third destinations 910-1, 910-2, 910-3. That is, according to address information of the first to third destinations listed on the destination address field of the original packet, the tunnel egress node 930 replicates the original packet to produce the first to third xcast packets to be sent to the first to third destinations 910-1, 910-2, 910-3 respectively. The first xcast packet to be sent to the first destination 910-1 comprises the source address field for the source address, the link local multicast address field, the destination address field for the first destination address, and the payload. Furthermore, the second destination address is listed on the destination address field in the second xcast packet, and the third destination address is listed on the destination address field in the third xcast packet. Subsequently, the tunnel egress node 930 sends the produced first to third xcast packets to the first to third destinations 910-1, 910-2, 910-3 respectively according to destination information listed on the destination address field of the first to third xcast packets.

Figure 11:
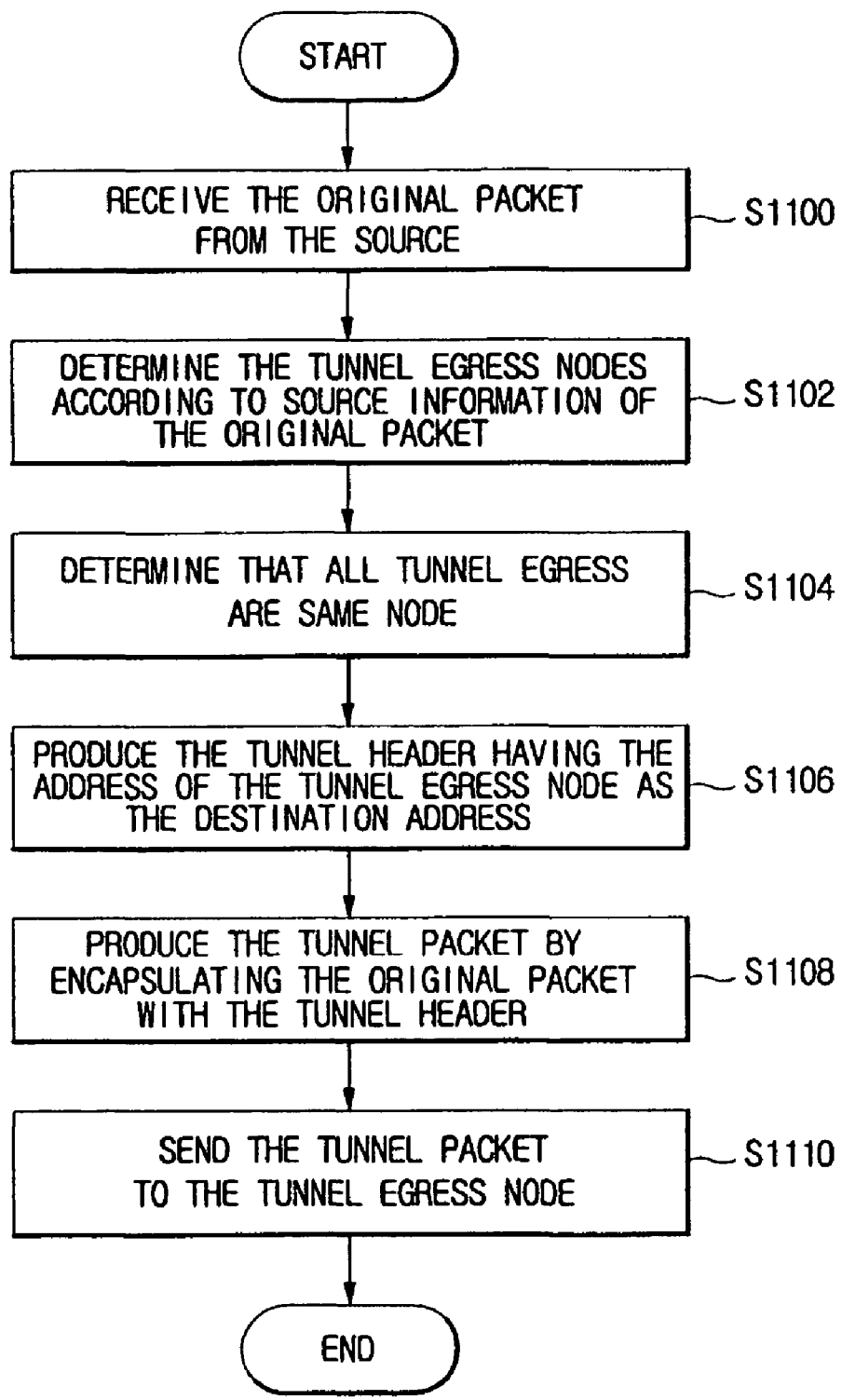
FIG. 11 is a flowchart for performing the unicast tunneling of xcast according to the invention.

Finally, the method for unicast tunneling of xcast will be described with the accompanying drawings. FIG. 11 is a flowchart for performing the unicast tunneling of xcast according to one embodiment of the invention. Furthermore, the unicast tunneling of xcast will be performed on the network configuration shown in FIG. 9.

Firstly, the tunnel ingress node 920 receives the original packet to be sent to the first to third destinations 910-1, 910-2, 910-3. (S1100) Here, the received original packet is an xcast packet having the first to third destination addresses that are explicitly listed on the destination address field.

Subsequently, the tunnel ingress node 920 determines the tunnel egress node, (i.e., exit from the tunnel), according to address information of the first to third destinations listed on the destination address field of the original packet. (S1102) The tunnel ingress node finds that all the exits of the tunnel for the original packet to be sent to the first to third destinations 910-1, 910-2, 910-3 are the same node, that is, the tunnel egress node 930. (S1104) The tunnel ingress node 920 produces the tunnel header that the address of the tunnel egress node 930 and the address of the tunnel ingress node are listed on the destination address field and the source address field of the tunnel header respectively. (S1106)

The tunnel ingress node 920 produces the tunnel packet by encapsulating the original packet with the produced tunnel header (S1108) and performs the unicast tunneling by sending the tunnel packet to the tunnel egress node 930 according to the address of the tunnel egress node listed on the destination address field of the tunnel packet. (S1110) The tunnel packet may pass through a plurality of transit nodes during the transmission to the tunnel egress node 930. The tunnel egress node 930 separates the tunnel header from the tunnel packet received from the tunnel ingress node 920, and performs the xcast service of the original packet. Since the Point-to-Point xcast service is well known to those who are skilled in the art, the detailed description will be omitted.

In one embodiment, the system and apparatus for xcast tunneling perform tunneling by producing the tunnel header that comprises the tunnel ingress address field, the link local multicast address field and a plurality of tunnel egress address fields, and encapsulating the xcast packet with the produced tunnel header.

Accordingly, since one embodiment of the invention uses a tunnel where the multicast tunneling is accessible, rather than a plurality of unicast tunnels, in order to perform the tunneling operation for transmitting the xcast packet having a plurality of tunnel egress nodes, the bandwidth and transmission time are reduced. Accordingly, the transmission efficiency of the packet improves.

Also, through the bitmap inheritance, (i.e., defined as the modification of the destination address of the original packet to be sent to the destination with address information of the destinations in the tunnel header), one embodiment of the invention can prevent duplicate transmission of the original packet to the destination.

Also, since one embodiment of the invention performs the unicast tunneling after producing the tunnel header including the tunnel ingress node address field and the tunnel egress node address field and encapsulating the original packet with the produced tunnel header when a plurality of destinations are connected to the same tunnel egress node, it is possible to perform fast routing during the tunneling.

While the above description has pointed out novel features of the invention as applied to various embodiments, the skilled person will understand that various omissions, substitutions, and changes in the form and details of the device of the device or process illustrated may be made without departing from the scope of the invention. Therefore, the scope of the invention is defined by the appended claims rather than by the foregoing description. All variations coming within the meaning and rage of equivalency of the claims are embraced within their scope.

What is claimed is:

1. An explicit multicast tunneling method, comprising:
receiving an explicit multicast packet from a source to be sent to a plurality of destinations, wherein the source and the plurality of destinations are in data communication with a tunnel ingress node and at least one tunnel egress node, respectively, and wherein the explicit multicast packet includes addresses of the plurality of destinations therein;
duplicating, at each tunnel egress node, the explicit multicast packet as many times as the number of destinations that are in data communication with the corresponding tunnel egress node;
modifying destination addresses of each of the duplicated multicast packets such that each destination does not repeatedly receive the same multicast packet; and
transmitting each of the modified multicast packets to the plurality of destinations based on the modified destination addresses.

2. The method of claim 1, wherein the at least one tunnel egress node comprises a plurality of tunnel egress nodes which are in data communication with the plurality of destinations, respectively.

3. The method of claim 2, further comprising:
determining the plurality of tunnel egress nodes based on the addresses of the plurality of destinations within the received explicit multicast packet so as to generate an address list of the plurality of tunnel egress nodes;
generating a tunnel header having the address list of the plurality of tunnel egress nodes as a destination address;
encapsulating the explicit multicast packet with the generated tunnel header so as to generate a tunnel packet;
sending the tunnel packet to the plurality of tunnel egress nodes via a plurality of transit nodes, located between the tunnel ingress node and the plurality of tunnel egress nodes, wherein the tunnel packet is duplicated, at each transit node, as many times as the number of subsequent nodes that are in data communication with the corresponding transit node; and
separating, at each tunnel egress node, the tunnel header from the tunnel packet so as to obtain the explicit multicast packet.

4. The method of claim 3, wherein the tunnel header comprises a tunnel ingress node address field, a link local multicast address field, an address list of tunnel egress nodes field, and a bitmap.

5. The method of claim 3, wherein the sending comprises:
determining a next route of the tunnel packet; and
modifying the destination address of the tunnel header according to the determined next route.

6. The method of claim 1, wherein the at least one tunnel egress node is one tunnel egress node in data communication with the plurality of destinations, and wherein the duplicating is performed at the one tunnel egress node.

7. An explicit multicast tunneling system, comprising:
a tunnel ingress node configured to receive an explicit multicast packet from a source to be sent to a plurality of destinations, wherein the source is in data communication with the tunnel ingress node, and wherein the explicit multicast packet includes addresses of the plurality of destinations therein;
at least one tunnel egress node being in data communication with the plurality of destinations; and at least one transit node located between the tunnel ingress node and the at least one tunnel egress node, wherein each of the at least one tunnel egress node is configured to duplicate the multicast packet as many times as the number of destinations that are in data communication with the corresponding tunnel egress node, and wherein the at least one tunnel egress node is configured to modify destination addresses of each of the duplicated multicast packets such that each destination does not repeatedly receive the same multicast packet, and is configured to transmit each of the modified multicast packets to the plurality of destinations based on the modified destination addresses.

8. The system of claim 7, wherein the source comprises a server and each of the plurality of destinations comprises an end user's computing device.

9. The system of claim 7, wherein the at least one tunnel egress node comprises a plurality of tunnel egress nodes which are, respectively, in data communication with the plurality of destinations.

10. The system of claim 7, wherein the tunnel ingress node is further configured to i) generate a tunnel header having an address list of the at least one tunnel egress node as a destination address, ii) encapsulate the explicit multicast packet with the generated tunnel header so as to generate a tunnel packet and iii) send the tunnel packet to the at least one tunnel egress node via at least one transit node, wherein each of the least one transit node is configured to duplicate the tunnel packet as many times as the number of subsequent nodes that are in data communication with the corresponding transit node, and wherein each of the at least one tunnel egress node is further configured to separate the tunnel header from the tunnel packet so as to obtain the explicit multicast packet, and duplicate the explicit multicast packet as many times as the number of destinations that are in data communication with the corresponding tunnel egress node.

* * * * *